United States Patent
Totsuka et al.

[15] 3,649,820
[45] Mar. 14, 1972

[54] DIGITAL MEASURING SYSTEM

[72] Inventors: Yasushi Totsuka; Shin-Ichi Kamachi, both of Tokyo, Japan

[73] Assignee: Olympus Optical Co., Ltd., Tokyo, Japan

[22] Filed: Dec. 29, 1969

[21] Appl. No.: 888,312

[52] U.S. Cl. ..................235/151.32, 33/143, 235/92 DN
[51] Int. Cl. ...........................................G06f 7/46
[58] Field of Search ..............235/151.3, 151.32, 92; 33/165, 33/174, 143, 147

[56] References Cited

UNITED STATES PATENTS

| | | | |
|---|---|---|---|
| 3,056,208 | 10/1962 | Murtland, Jr. et al. | 33/147 |
| 3,132,262 | 5/1964 | Kaufmann | 235/92 UX |
| 3,142,121 | 7/1964 | Stefanov | 33/143 |

Primary Examiner—Malcolm A. Morrison
Assistant Examiner—Edward J. Wise
Attorney—Otto John Munz

[57] ABSTRACT

Digital measuring system comprising the steps of generating pulse signals indicative of values for the desired measurement of an object by using at least a pair of detecting stations and counting the respective pulse signals by a single counter. In order to prevent each subsequent pulse signal from occurring within the minimal sequential response speed of the counter when the pulse signals derived from the pair of detecting stations are summed so as to be applied to the counter, thereby avoiding false function of the counter, the digital measuring system comprises the steps of converting the pulse signals respectively into rectangular pulses, the duration of the rectangular pulses being made greater than the minimal sequential response interval of the counter, producing logic AND output and logic OR output from the rectangular pulses, and summing instantaneous differential pulse signals generated by either one of the logic AND and OR outputs and those generated by the negative logic output of the other of the logic AND and OR outputs so that output pulses having a time interval at least equal to the predetermined duration of the rectangular wave pulses are produced which are supplied to the counter so as to obtain the desired digital measured value without causing any false function of the counter. Each of the detecting stations may produce addition and subtraction pulse signals which are supplied together to a reversible counter.

12 Claims, 9 Drawing Figures

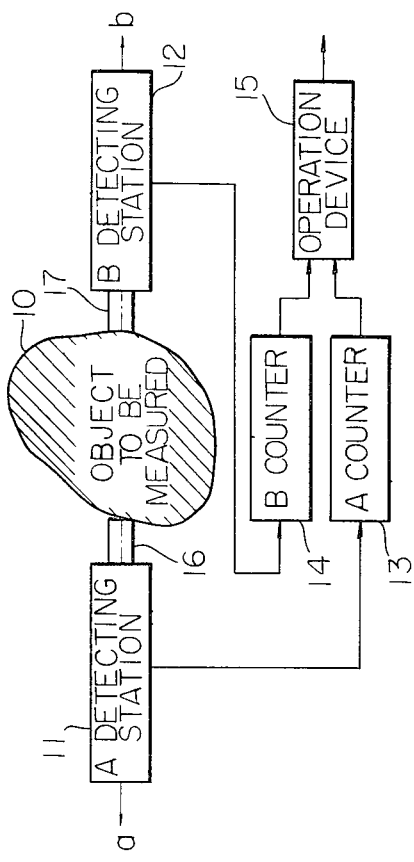
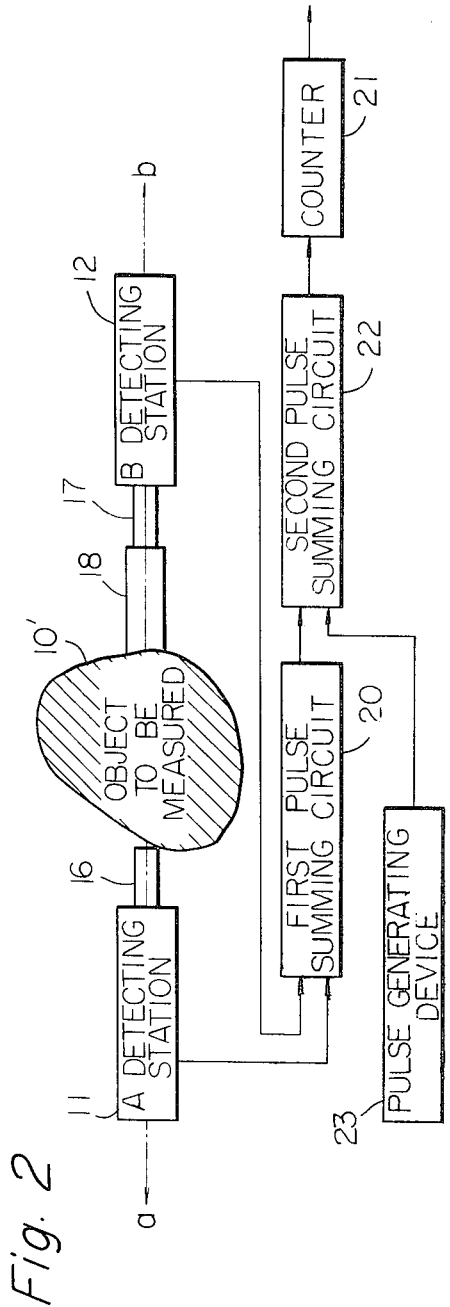

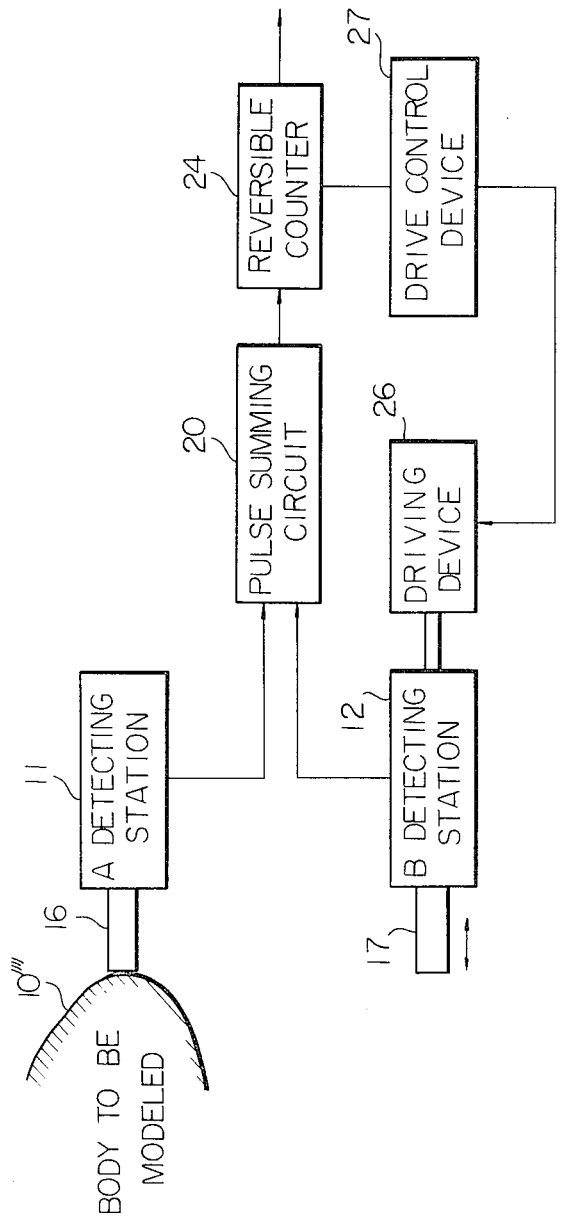

DIGITAL MEASURING SYSTEM

BACKGROUND OF THE INVENTION

The present invention relates to a digital measuring system, and more particularly to a digital measuring system in which pulse signals derived from at least a pair of detecting stations are summed or combined so as to be supplied to a single counter, whereby the desired digital measured value with respect to an object is obtained without causing any false operation of the counter which might otherwise take place because of a subsequent pulse existing within the maximum response speed of the counter when the pulse signals derived from the pair of detecting stations are summed by maximum response speed is meant the minimum time between pulses such that the counter can respond separately to both pulses, or more simply, the minimal sequential response interval of the counter.

In general, several limitations necessarily exist in the measurement of an object (such as the measurement of the length of the object or the measurement of an angle with respect of the object) due to the configuration, size or the weight of the object. In measurement using a digital measuring instrument such as an encoder, a moire fringe measuring instrument or a magnetic scale, it is necessary to suitably treat the pulse signals obtained by the detecting station of the measuring instrument or values counted by the counter of the measuring instrument. For example, a pair of detecting stations is required in case the object to be measured must be clamped by the detecting stations from opposite sides of the object depending upon the weight or the configuration thereof. In such a case, the two detecting stations are located in alignment with each other so that they can be moved on a common axis so as to clamp the object therebetween. The pulse signals generated by the two detecting stations, respectively, are supplied to two counters, respectively, and the outputs of the two counters are supplied to an operation device so as to sum the outputs of the counters. In operation, the feelers of the two detecting stations are first contacted with each other and the two counters are reset to zero, respectively, and then the feelers are moved so as to clamp the object therebetween, so that the desired digital measured value is obtained. In this case, the counters are so set that the addition counting pulses are generated in each of the counters when the feelers of the detecting stations are moved apart from each other.

However, in such a prior art measuring system, two counters and an operating device are required, thereby resulting in a large and complicated measuring device.

Further, when a compensating body such as a block gage is utilized in measuring an object by using a pair of detecting stations, the working strokes i.e., length of extension) of which are too small to cover the size of the object, it is necessary to compensate for the desired measured value in consideration of the compensating body by adding pulses indicative of the compensating body to the pulses derived from the detecting stations, thus making it necessary to add a further pulse-generating device.

The present invention aims at avoiding the above-described disadvantages of the prior art measuring system and providing a novel and useful digital measuring system which is simple in construction, requiring only a single counter, even through a plurality of detecting stations or pulse-generating devices are to supply their respective pulses to the single counter.

SUMMARY OF THE INVENTION

An object of the present invention is to provide a novel and useful digital measuring system which avoids the disadvantages of the prior art measuring system.

Another object of the present invention is to provide a novel and useful digital measuring system of the type described above which requires only a single counter, even though a plurality of detecting stations or pulse-generating devices are to supply their respective pulses to the single counter.

Further object of the present invention is to provide a novel and useful digital measuring system of the type described above in which additional counting pulses and subtraction counting pulses are generated in each of the detecting stations and can be counted together in a single reversible counter.

The above-described objects of the present invention are achieved in accordance with the present invention by summing or combining the pulses derived from two pulse-generating sources so that a single output is generated (in which the total number of pulses of the two pulse-generating sources exist) so as to be supplied to a single counter. In case the pulse signals generated by the pulse-generating sources comprise addition counting pulses and subtraction pulses, the respective addition counting pulses from the two sources are summed while the respective subtraction pulses are summed so that two outputs are generated. These two outputs comprise addition output pulses and subtraction output pulses, respectively, and are to be supplied together to a single reversible counter.

In supplying the pulses to a counter, it must be taken into consideration that each subsequent pulse should not exist within the maximum response speed of the counter in order to prevent false function thereof.

In accordance with the present invention, the occurrence of a subsequent pulse within the maximum response speed of the counter from the preceding pulse, as might occur when the two series of the pulses are summed, is prevented by the steps of converting the two series of pulses into rectangular wave pulses, respectively, the duration of which rectangular wave pulses is selected to be greater than the maximum response speed of the counter, producing logic AND output and logic OR output from the two series of rectangular wave pulses, respectively, and summing or combining instantaneous differential pulse signals generated by either one of the logic AND and OR outputs and those generated by the negative logic output of the other of the logic AND and OR outputs so that output pulses having a time interval equal to the duration of the rectangular wave pulses at the shortest are generated, which are supplied to the counter so as to obtain the desired digital measured value without fail by virtue of the fact that each subsequent pulse occurs in the time interval which is greater than the maximum response speed of the counter.

Any equivalent means may be adopted in the present invention insofar as the function and the result equivalent to the above are obtained.

BRIEF DESCRIPTION OF THE DRAWINGS

FIG. 1 is a block diagram showing one type of the prior art measuring systems;

FIG. 2 is a block diagram showing an embodiment of the digital measuring system according to the present invention;

FIG. 9 is a block diagram showing the manner how the present invention is applied to a profiling or modeling apparatus.

DETAILED DESCRIPTION OF THE PREFERRED EMBODIMENTS

Figure 3:
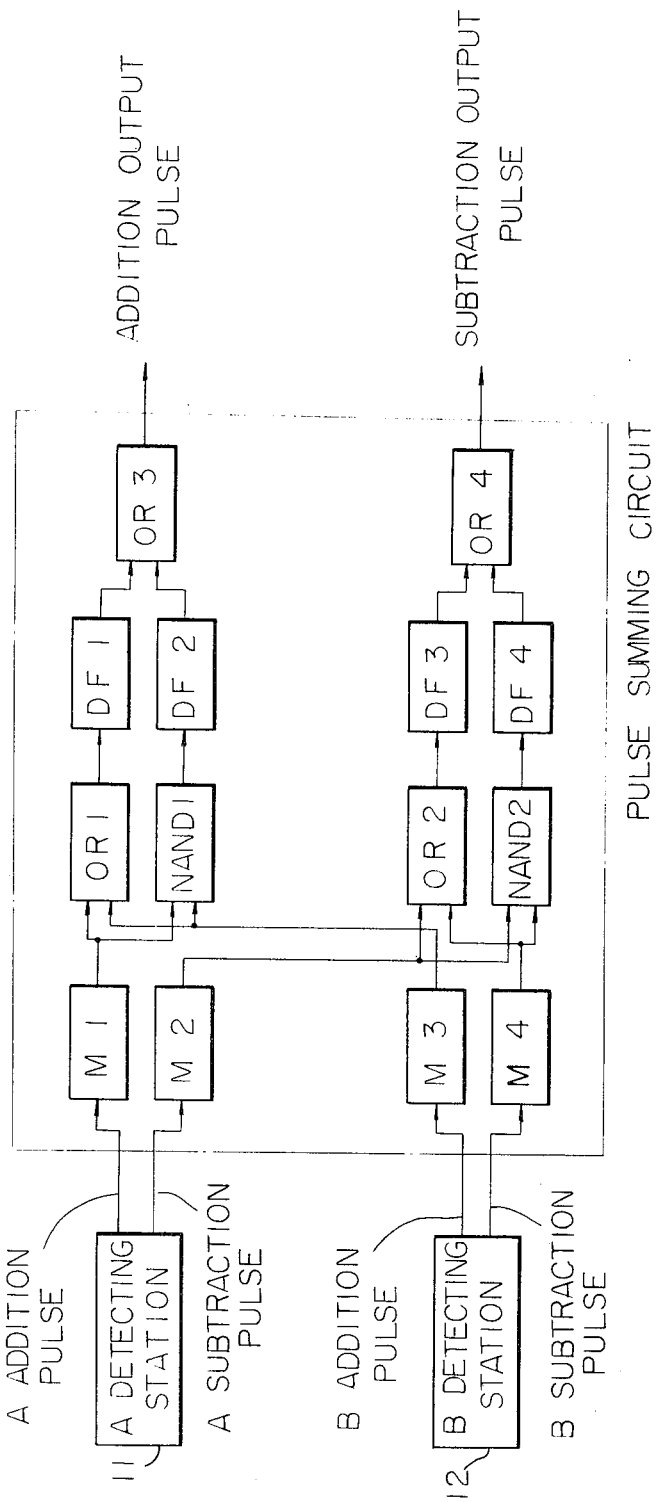
FIG. 3 is a block diagram showing an embodiment of the pulse summing circuit used in the present invention.

Referring to FIG. 1 showing the prior art measuring system, a pair of A and B detecting stations designated respectively by the reference numerals 11 and 12 are located on an axis $a-b$ in alignment with each other and spaced an appropriate distance from each other. A and B detecting stations 11 and 12 have feelers 16 and 17, respectively, which are moved on the axis $a$—$b$ so that the tips of the feelers 16 and 17 are adapted to clamp an object 10 to be measured therebetween, while the tips of the feelers 16 and 17 can be placed in contact with each other so that the reference point is set. An A-counter 13 is connected to A-detecting station 11 while another B counter 14 is connected to B-detecting station 12. An input of an operation device 15 is connected to the output of each of the A- and B-counters 13 and 14. A detecting station 11 is so set that it produces pulse signals when the feeler 16 is moved in the direction indicated as $a$, while B-detecting station 12 is so set that it produces pulse signals when the feeler 17 is moved in the direction indicated as $b$. In operation, the feelers 16 and 17 are first moved so as to contact with each other while A- and B-counters 13 and 14 are reset to zero, respectively, so as to set the reference point. Then, the feelers 16 and 17 are moved apart and the object 10 is interposed therebetween so as to clamp the object by the feelers 16 and 17 at the desired positions of the object 10. Thus, A- and B-counters 13 and 14 generate pulse signals corresponding to the respective stroke of the respective feelers 16 and 17 and the pulse signals are supplied to the operation device 15 so that the desired digital measurement of the object is obtained. As described previously, the prior art measuring system such as shown in FIG. 1 requires two counters and an additional operation device, thus making the system large and complicated.

Referring to FIG. 2, showing an embodiment of the digital measuring system of the present invention, A and B detecting stations 11 and 12 with the respective feelers 16 and 17 are provided in like manner as shown in FIG. 1. However, in accordance with the characteristic feature of the present invention, only a single counter 21 is provided. The pulse signals derived from A- and B-detecting stations 11 and 12 are supplied to a first pulse-summing or combining circuit 20, and the output of the first pulse-summing circuit 20 is supplied to the counter 21 either through a second pulse-summing circuit 22 or directly to the counter 21. The second pulse-summing circuit 22 serves to adjust for the desired measurement of the object 10' by receiving pulses from a pulse-generating device 23 adapted to generate pulses corresponding to a compensating body 18, which may be a block gage. The compensating body 18 such as a block gage would be used when the strokes of the feelers 16 and 17 are insufficient to cover the required amount for measuring the object 10'.

In order to prevent a subsequent overlapping pulse from occurring (and getting lost in) the output of the pulse-summing circuit 20 or 22 when the two series of pulse signals are supplied thereto together as previously described, the pulse-summing circuit is constructed in accordance with the present invention as shown in FIG. 3.

FIG. 3 shows an embodiment of the pulse-summing circuit wherein addition and subtraction pulses derived from A-detecting station 11 are supplied to the pulse summing circuit together with addition and subtraction pulses derived from B-detecting station 12. The addition pulses derived from A-detecting station 11 and the addition pulses derived from B-detecting stations 12 are summed so as to generate addition output pulses. Each subsequent pulse being prevented from occurring within the maximum response speed of the counter to be connected thereto, i.e., the pulses are prevented from occurring so close together that the counter cannot distinguish between them. The subtraction pulses derived from A-detecting station 11 and the subtraction pulses derived from B-detecting station 12 are summed so that subtraction output pulses are generated in which each subsequent pulse is prevented from occurring within the maximum response speed of the counter to be connected thereto. To this end, as shown in FIG. 3, monostable multivibrators M1 and M2 are connected so as to receive the addition pulses and subtraction pulses from A-detecting station 11, respectively. Monostable multivibrators M3 and M4 are connected so as to receive the addition pulses and subtraction pulses derived from B-detecting station 12, respectively. The time constant $T_1$ of each of the multivibrators M1 to M4 is selected to be a predetermined time $T_1$ greater than the maximum response speed of the counter to be used in the measuring system of the present invention, whereby the duration of the rectangular wave pulses produced by each of the multivibrators M1 to M4 is made greater than the maximum response speed of the counter. An OR circuit OR1 is connected to the output of the multivibrator M1 and the output of the multivivibrator M3 while the negative logic circuit of an AND circuit (i.e., NAND circuit) NAND1 is connected to the outputs of the multivibrators M1 and M3. Similarly, another OR circuit OR2 is connected to the outputs of the multivibrators M2 and M4 while another negative logic circuit of an AND circuit NAND2 is connected to the outputs of the multivibrators M2 and M4. The respective outputs of the OR circuits and the negative logic circuits OR1, NAND1, OR2 and NAND2 are connected to differential i.e., differentiating) circuits DF1, DF2, DF3 and DF4, so that outputs of these differential circuits DF1 to DF4 are made instantaneous pulses representing the instantaneous rise in each pulse in the inputs thereof. The output of the differential circuit DF1 and the output of the differential circuit DF2 are supplied to an OR circuit OR3 connected thereto while another OR circuit OR4 is connected to the outputs of the differential circuits DF3 and DF4.

Figure 5:
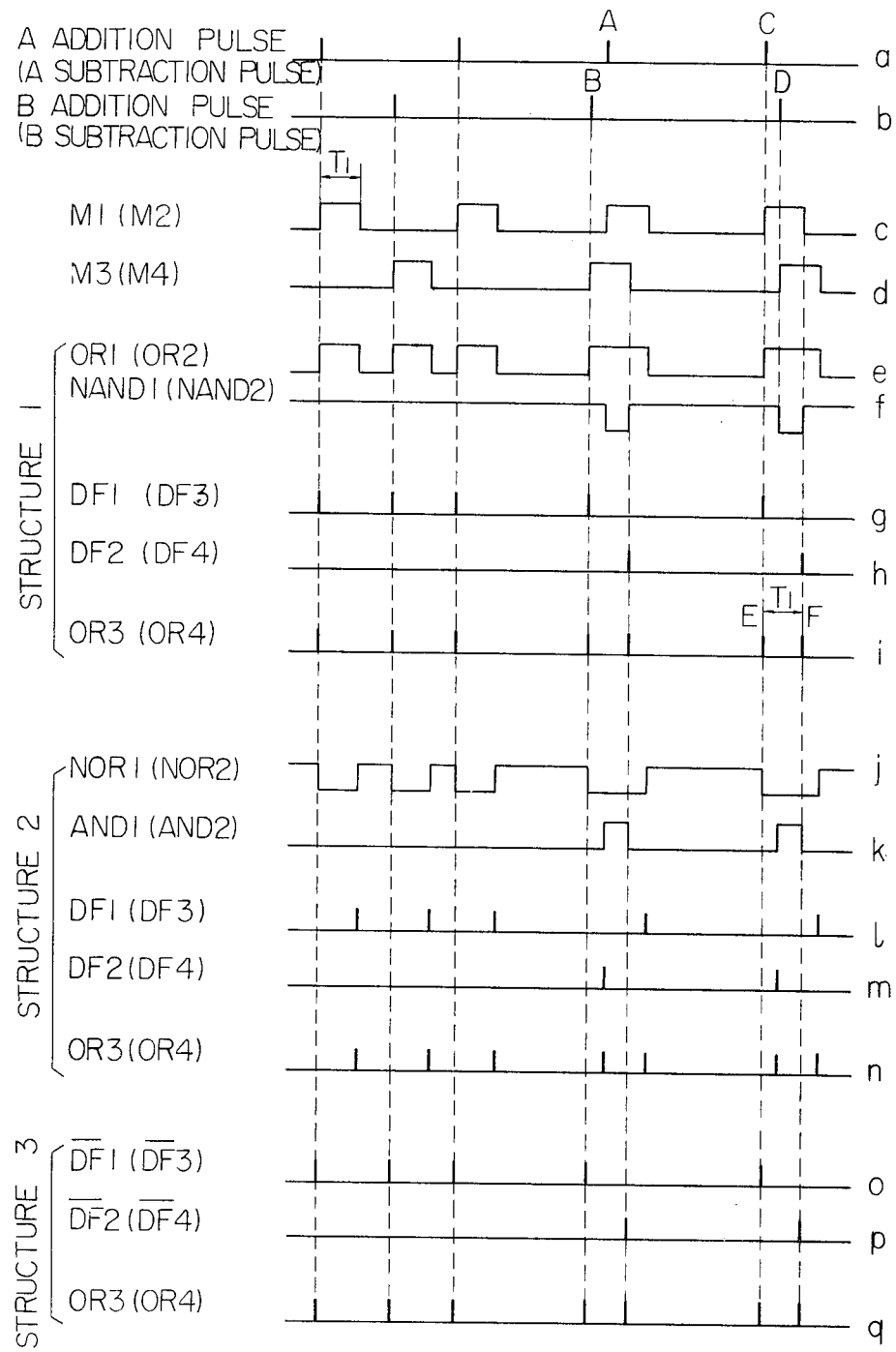
FIG. 5 is a time chart of FIG. 3.

As described above, the addition pulses and subtraction pulses are treated independently from each other, and the function of the pulse-summing circuit shown in FIG. 3 with respect to the addition pulses is similar to that with respect to the subtraction pulses. Therefore, only the function of the pulse-summing circuit of FIG. 3 with respect to the addition pulses will be described below. FIG. 5 shows a time chart indicating the function of the pulse-summing circuit of FIG. 3. As shown in FIG. 5, the addition pulses $a$ and $b$ derived from A- and B-detecting stations 11, 12 are converted into rectangular wave pulses $c$ and $d$ by the multivibrators M1 and M3 respectively, and the duration of the rectangular wave pulses is a time $T_1$ which is greater than the maximum response speed of the counter to be used with the pulse-summing circuit of FIG. 3. The outputs of the OR circuit OR1 and the negative logic circuit NAND1 which receive the rectangular wave pulses $c$ and $d$ are indicated by $e$ and $f$. Thus, the differential circuits DF1 and DF2 are made instantaneous pulses as indicated by $g$ and $h$, respectively, and the pulses $g$ and $h$ are summed by the OR circuit OR3 as indicated by $i$. by virtue of the interposition of the OR circuit OR1 and the negative logic circuit NAND1, the time interval between the pulses in the outputs $g$ and $h$ is made at least equal to the time $T_1$ at the shortest even though the time interval of the pulses in the original addition pulses $a$ and $b$ might be shorter than the time $T_1$, as shown by pulses A, B, C, and D, and each subsequent pulse in the output $i$ occurs after the time interval $T_1$ at the shortest. Therefore, false function of the counter by overlapping of response is avoided when the output $i$ of the OR circuit OR3 is supplied thereto.

Similar function as above is obtained when the OR circuit OR1 is replaced by a negative logic circuit of an OR circuit (i.e., NOR circuit) NOR1 and, at the same time, the negative logic circuit NAND1 is replaced by an AND circuit AND1 as shown by the structure 2 in FIG. 5. In this case, however, occurrence of the instantaneous pulses in the outputs $l$ and $m$ of the differential circuits DF1, DF2 are somewhat shifted as shown in comparison with those taking place in the outputs $g$ and $h$ in the structure 1 described previously. But the occurrence of a subsequent pulse within the time $T_1$ from the preceding pulse is prohibited in the structure 2.

Similarly, the differential circuits DF1 to DF4 may be replaced by differential circuits $\overline{DF1}$, $\overline{DF2}$, $\overline{DF3}$ and $\overline{DF4}$, respectively, which produce instantaneous pulses representing instantaneous descent (rather than rise) in the respective rectangular wave pulses, in order to achieve similar result to these described above. Structure 3 shows the differential circuits $\overline{DF1}$ to $\overline{DF4}$ used together with the negative logic circuit NOR1 (NOR2) and the AND circuit AND1 (AND2) in the structure 2 of FIG. 3.

The same as described above applies to the function of the pulse-summing circuit with respect to the subtraction pulses.

Further, negative logic circuits of monostable multivibrators may be substituted for the multivibrators M1 to M4 in order to achieve the similar results as described above.

It is evident that any alteration is possible in the present invention in order to obtain the similar results as described above insofar as the relationship between the inputs and their respective outputs satisfies the logic function similar to the above described principle.

Figure 4:
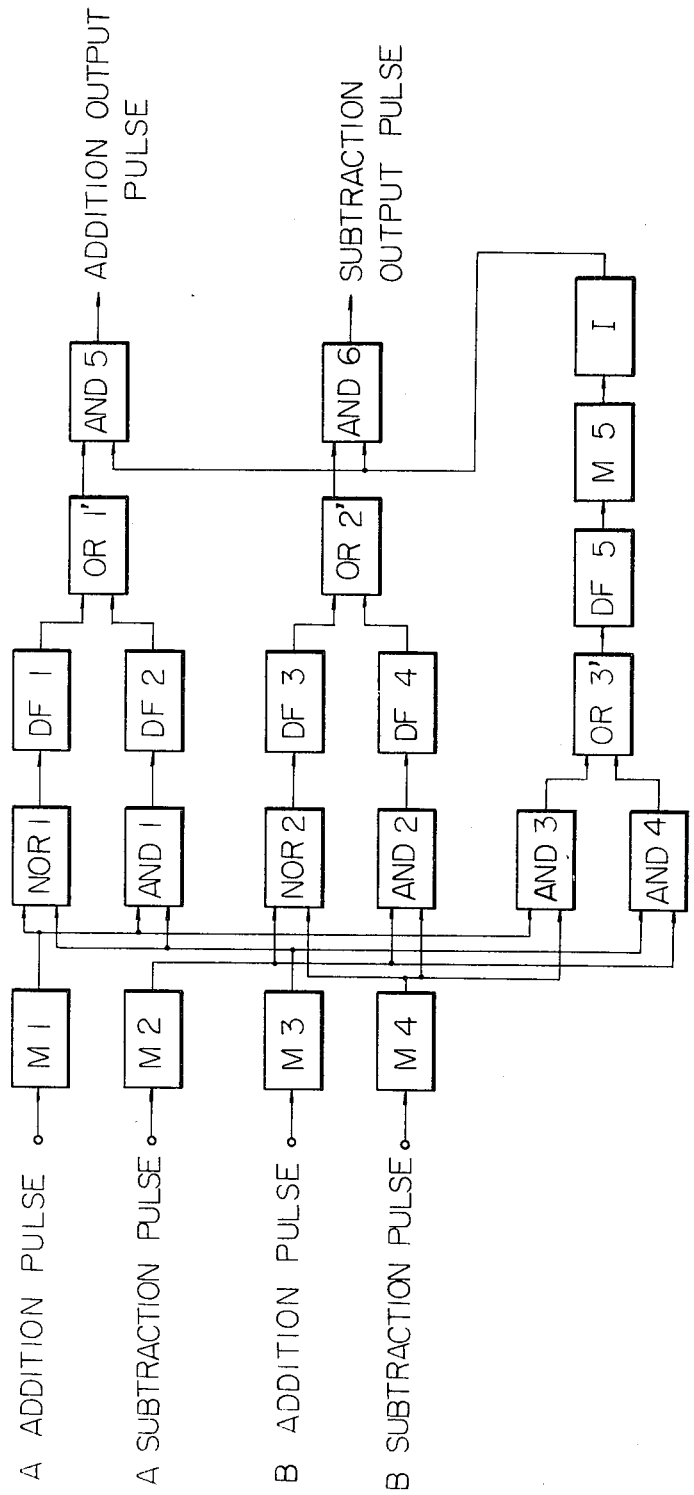
FIG. 4 is a block diagram showing another embodiment of pulse-summing circuit used in the present invention.

In order to prevent any of the addition output pulses from occurring within the maximum response speed of the counter after the occurrence of the subtraction output pulses or vice versa, thereby making it possible to supply the addition output pulses and the subtraction output pulses together to a single reversible counter, whereby accurate counting is effected by the reversible counter without any false function thereof, further logic circuits are incorporated in the present invention as shown in FIG. 4.

In FIG. 4, the multivibrators M1 to M4, the negative logic circuits and the AND circuits NOR1, AND1, NOR2 and AND2, and the differential circuits DF1 to DF4 are shown to be similar to those previously described in connection with FIGS. 3 and 5. In this case, the OR circuit OR3 in FIG. 3 is indicated by OR1' in FIG. 4 and the OR circuit OR4 in FIG. 3 is indicated by OR2'. The function of the above-described elements of FIG. 4 are similar to that described in connection with fIG. 3. A further AND circuit AND3 is connected to the output of the multivibrator M1, receiving the addition pulses derived from A-detecting station 11, as well as to the output of the multivibrator M4, receiving the subtraction pulses derived from B-detecting station 12. Another AND circuit AND4 is connected to the output of the multivibrator M2, receiving the subtraction pulses derived from the A-detecting station 11, as well as to the output of the multivibrators M3, receiving the addition pulses derived from B-detecting station 12. An OR circuit OR3' is connected to the outputs of the AND circuits AND3 and AND4, and the output of the OR circuit OR3' is supplied to a differential circuit DF5 connected thereto. A monostable multivibrator M5 having a time constant $T_2$ which is equal to or greater than the time $T_1$ ($T_2 \geq T_1$) is connected to the output of the differential circuit DF5, while the output of the multivibrator M5 is supplied to a negative logic circuit I connected thereto.

The output of the OR circuit OR1' and the output of the negative logic circuit I are supplied to an AND circuit AND5, while the output of the OR circuit OR2' and the output of the negative logic circuit I are supplied to an AND circuit AND6.

Figure 6:
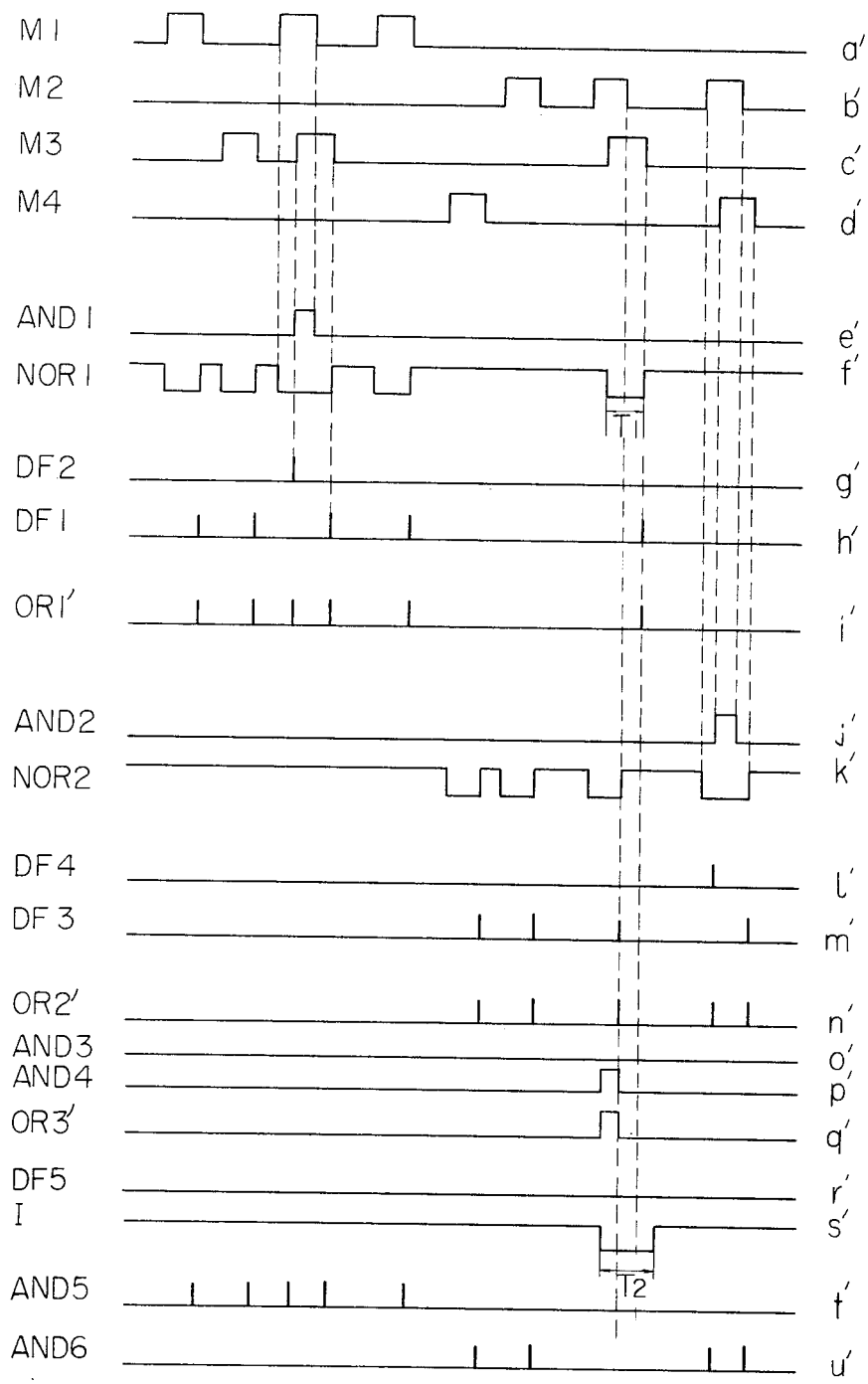
FIG. 6 is a time chart of FIG. 4.

FIG. 6 shows the time chart showing the function of the pulse-summing circuit of FIG. 4. In FIG. 6, the addition pulses and subtraction pulses derived from A-detecting station 11 and B-detecting station 12, respectively, are converted by multivibrators M1 to M4 into rectangular wave pulses $a'$ to $d'$ having a duration $T_1$, in like manner as in the case of FIG. 5. Thus, the AND circuit AND1 and the negative logic circuit NOR1 respectively produce the pulses $e'$ and $f'$ as shown, while the outputs of the AND circuit AND2 and the negative logic circuit NOR2 are made in the form shown respectively by $j'$ and $k'$. In like manner as in the case of FIG. 3. The differential circuits DF1 to DF4 produce the respective outputs as respectively indicated by $h'$, $g'$, $m'$ and $1'$, and the outputs $h'$ and $g$ of the differential circuits DF1 and DF2 are summed by the OR circuit OR1' so as to produce the addition output pulses as shown by $i'$ in which the time interval of the pulses is made equal to the time $T_1$ at the shortest, while the outputs $m'$, $1'$ of the differential circuits DF3, DF4 are summed by the OR circuit OR2' so as to produce the subtraction output pulses as indicted by $n'$ in which the time interval of the pulses is made equal to the time $T_1$ at the shortest.

The pulses in the addition output pulses of the OR circuit OR1' occurring within the maximum response speed of the counter after the occurrence of the pulses in the subtraction output pulses of the OR circuit OR2' or vice versa are avoided in the following manner. The AND circuit AND3 produces a pulse only when a pulse is produced in the output of the multivibrator M1, which receives the addition pulses derived from A-detecting station 11, within the time $T_1$ after the occurrence of a pulse in the output of the multivibrator M4, which receives the subtraction pulses derived from B-detecting station 12, or vice versa as indicated by $o'$. In a similar manner, the AND circuit AND4 produces a pulse only when a pulse is generated in the output of the multivibrator M2, which receives the subtraction pulses derived from A-detecting station 11, within the time $T_1$ after the occurrence of a pulse in the output of the multivibrator M3, which receives the addition pulses derived from B-detecting station 12, or vice versa as indicated by $L'$. And the outputs $0'$ and $p'$ are summed by the OR circuits OR3' so as to produce the output '$q$'. The differential circuit DF5 produces an instantaneous pulse upon receipt of a pulse from the OR circuit OR3' as shown by $r'$. The output $r'$ of the differential circuit DF5 is supplied to the multivibrator M5 and triggers the same so that the output thereof is supplied to the negative logic circuit I thereby producing the output $s'$ in which a zero pulse of the duration $T_2$ is generated each time a pulse appears in the output $q'$ of the OR circuit OR3'.

Since the zero pulse in the negative logic circuit I has a duration $T_2$, which is equal to or greater than the duration $T_1$, occurrence of any pulse in the respective addition output pulses $t'$ of the "and" circuit AND5 and the subtraction output pulses $u'$ of the AND circuit AND6 within the time interval $T_1$ with respect to each other is positively prevented. In other words, when a pulse is generated in either of the addition output pulses $i'$ and the subtraction output pulses $n'$ within the time interval after the occurrence of a pulse in the other of the addition output pulses $i'$ and the subtraction output pulses $n'$, those pulses in the respective addition and subtraction output pulses $i'$ and $n'$ are extinguished or prevented from occurring in either of the addition output pulses $t'$ and the subtraction output pulses $u'$ by virtue of the provision of the negative logic circuit I which receives the outputs of the AND circuits AND3 and AND4 through the OR circuit OR3', the differential circuit DF5 and multivibrator M5 and supplies the output thereof to the AND circuits AND5 and AND6.

Thus, the outputs $t'$ $u'$ and can be supplied to the single reversible counter without causing any false function thereof.

The above-described embodiment may be altered by, for example, modifying the input pulses to the differential circuits DF1 to DF4 by applying the output of the negative logic circuit I to the input pulses, or modifying the input pulses to the OR circuits OR1', OR2'. Any other means may be adopted insofar as the same effect as above is obtained thereby.

The time constant of each of the multivibrators M1 to M4 may slightly differ from each other insofar as the time constant of each of the multivibrators is greater than the maximum response speed of the counter used.

Further, in the present invention, the addition pulses derived from B-detecting station 12 may be supplied to the multivibrator M4 in place of the multivibrator M3, while the subtraction pulses derived from B-detected station 12 is supplied to the multivibrator M3. In this case, the final addition output pulses are made (addition pulses from A-detecting station 11) + (subtraction pulses from B-detecting station 12) while the final subtraction output pulses are made (subtraction pulses from A-detecting station 11) + (addition pulses from B-detecting station B). Therefore, the measured value of the counter indicates the difference in the stroke of the feeler 16 of A-detecting station 11 from the stroke of the feeler 17 of B-detecting station 12. In a similar manner, the addition pulses from A-detecting station 11 may be supplied to the multivibrator M2, while the subtraction pulses from A-detecting station 11 is supplied to the multivibrator M1. Further, the addition and subtraction pulses from the respective A- and B-detecting stations 11 and 12 may be interchanged.

Figure 7:
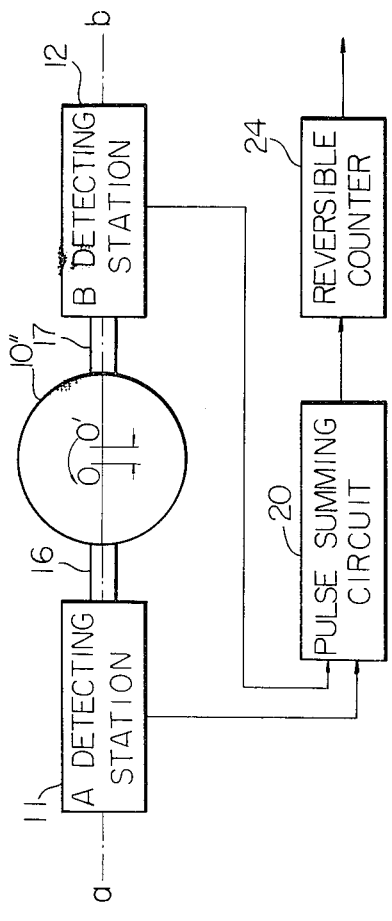
FIG. 7 is a block diagram showing how the present invention is applied to the measurement of eccentricity of a circular rod.
Figure 8:
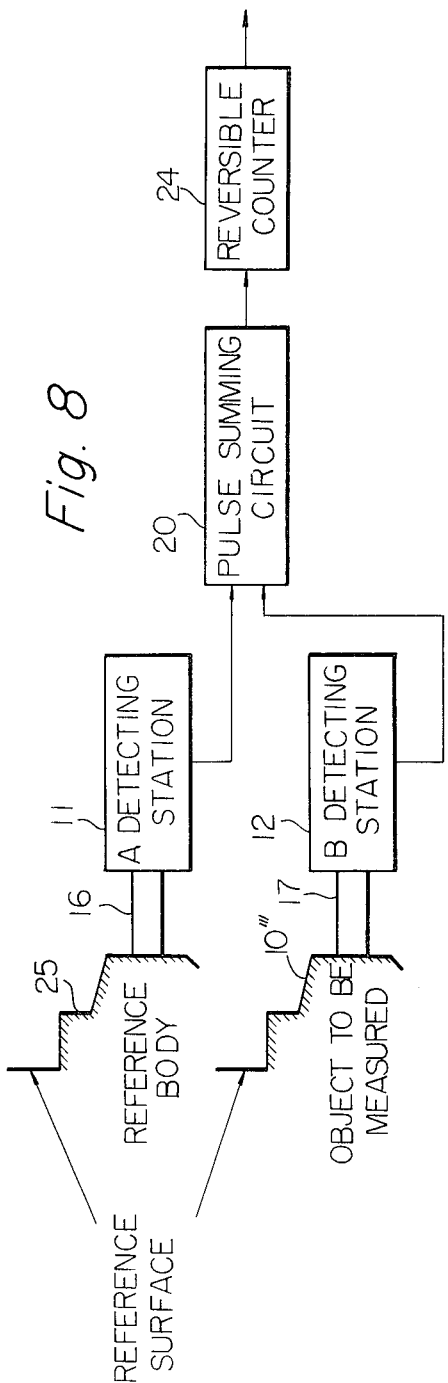
FIG. 8 is a block diagram showing how the present invention is applied to the comparison measurement of a profiled object with a reference body.

FIGS. 7 to 9 show how the above-described principle of the present invention can be applied to various measurements.

FIG. 7 shows how to detect the eccentricity of a circular rod 10″ having a center 0 and which is rotated about an axis 0′ spaced from the center 0. In this case, both A- and B-detecting stations 11 and 12 are so set that addition pulses are generated in both the detecting stations 11 and 12 when the respective feelers 16 and 17 are moved toward $b$ on the axis $a$—$b$, while subtraction pulses are generated in both the detecting stations 11 and 12 when the feelers 16 and 17 are moved toward $a$. The outputs of the detecting stations are supplied to the pulse-summing circuit 20 and the output thereof is supplied to the reversible counter 24.

In operation, the rod 10″ is rotated about the axis 0′ until the measured value of the counter 24 is minimized, and the counter 24 is reset to zero. Then, the rod 10″ is rotated about the axis 0′ by 180° until the counter 24 indicates the maximum value. The required eccentricity of the rod 10″ is the obtained maximum value divided by 4.

FIG. 8 shows how to make a comparison measurement of an object 10‴ with respect to a reference body 25. The circuitry is similar to that of FIG. 7, except that A-detecting station 11 is so set that addition pulses are generated when the feeler 16 is moved in the leftward direction in the drawing, and subtraction pulses are generated when the feeler 16 is moved in the rightward direction, while B-detecting station 12 is is so set that addition pulses are generated when the feeler 17 is moved in the rightward direction and subtraction pulses are generated when the feeler 17 is moved in the leftward direction.

In operation, the feelers 16 and 17 are placed in contact with the reference surfaces, the accurate position of which is already known, and the reversible counter 24 is reset to zero. Then, the feelers 16 and 17 are placed in contact with the reference body 25 and the corresponding portion of the object 10‴, respectively. The value indicated by the counter 24 corresponds to (stroke of feeler 17) minus (stroke of feeler 16). When the indication of the counter 24 remains zero, it indicates that no difference exists between the reference body 25 and the object 10‴, whereas the difference therebetween is indicated by the indication of the counter 24.

Finally, FIG. 9 shows how the modeling or profiling of a body 10″″ is achieved. The circuitry of FIG. 9 is similar to that of FIG. 8 except that a driving device 26 is added which drives the feeler 17 of B-detecting station 12 in response to the demand from a drive control device 27 connected thereto, which in turn receives signals from the reversible counter 24 and controls the driving device 26, thereby driving the feeler 17 so that the output of B-detecting station 12 is generated until the indication of the reversible counter 24 is reduced to be zero.

In operation, the feeler 16 is placed in contact with the body 10‴ to be modeled and moved along the profile of the body 10″″. Then, the output of A detecting station 11 is supplied to the pulse summing circuit 20 and thence to the reversible counter 24. The resulting variation in the content of the counter 24 supplies signals to the drive control device 27 which in turn controls the driving device 26 so as to move the feeler 17 until the output of B detecting station 12 reduces the indication of the counter 24 to zero. Thus, the movement of the feeler 17 is made to correspond to that of the feeler 16 moving along the profile of the body 10″″ to be modeled.

We claim:

1. In a process for digital measurement of a value with respect to an object comprising the steps of:
    A. generating two series of pulse signals indicative of said value by means of a pair of detecting stations moved from the respective reference points thereof until they reach predetermined points set with respect to the object, and
    B. counting said two series of pulse signals by means of a counting means having a minimal sequential response interval so as to obtain the value to be measured with respect to the object, the improvement comprising the steps of:
    C. converting said two series of pulse signals respectively into two series of rectangular pulses, the pulses in each of said two series of rectangular pulses having a predetermined duration greater than said minimal sequential response interval of said counting means,
    D. producing a first logic OR combination output and a logic NAND combination output from said two series of rectangular pulses,
    E. respectively differentiating said first logic OR combination output and said logic NAND combination output to produce respectively two series of instantaneous output pulses in which the time interval between any two respectively adjacent pulses occurring in said two series of instantaneous output pulses is made at least equal to said predetermined duration of said rectangular pulses,
    F. producing a second logic OR combination output from said two series of instantaneous output pulses, and
    G. counting said second logic Or combination output derived from said two series of instantaneous output pulses by means of said counting means, thereby preventing the type of faulty counter operation in which first and second pulses occur sequentially so fast that the counter cannot respond separately to the second pulse.

2. A process according to claim 1, further comprising the steps of:
    A. generating an additional series of pulse signals indicative of an amount of compensation to be provided for the measured value,
    B. summing said second logic OR combination output and said additional series of pulse signals to generate compensation output pulses, and
    C. counting said compensation output pulses by said counting means, thereby simultaneously counting said second OR combination output and said compensation output.

3. In a process for digital measurement of a value with respect to an object comprising the steps of:
    A. Generating two series of pulse signals indicative of said value by means of a pair of detecting stations moved from the respective reference points thereof until they reach predetermined points with respect to the object, and
    B. counting said two series of pulse signals by means of a counting means having a minimal sequential response interval so as to obtain the value to be measured with respect to the object, the improvement comprising the steps of:
    C. converting said two series of pulse signals respectively into two series of rectangular pulses, the pulses in each of said two series of rectangular pulses having an approximately predetermined duration greater than said minimal sequential response interval of said counting means,
    D. producing a logic NOR combination output and a logic AND combination output from said two series of rectangular pulses,
    E. respectively differentiating said logic NOR combination output and said logic AND combination output to produce respectively two series of instantaneous output pulses in which the time interval between any two respectively adjacent pulses occurring in said two series of instantaneous output pulses is made at least equal to said predetermined duration of said rectangular pulses,
    F. producing a logic OR combination output from said two series of instantaneous output pulses, and
    G. counting said logic OR combination output derived from said two series of instantaneous output pulses by means of said counting means, thereby preventing the type of faulty counter operation in which first and second pulses occur sequentially so fast that the counter cannot respond separately to the second pulse.

4. A process according to claim 3, further comprising the steps of:

A. generating an additional series of pulse signals indicative of the amount of compensation to be provided for the measured value, B. Summing said logic OR combination output and said additional series of pulse signals to generate compensation output pulses, and C. counting said compensation output pulses by said counting means, thereby simultaneously counting said OR combination output and said compensation output.

5. In a process for digital measurement of a value with respect to an object comprising the steps of:

A. generating a first and a second series each of addition and subtraction pulse signals indicative of said value respectively by means of a first and a second detecting station, each station being moved from a respective reference point thereof until it reaches a predetermined point with respect to the object, said addition pulse signals being generated when each of said first and second detecting stations is moved in a predetermined direction with respect to each of said detecting stations while said subtraction pulse signals are generated when each of said detecting stations is moved in the opposite direction, and B. counting said addition and subtraction pulse signals of said first and second series by means of a reversible counting means having a minimal sequential response interval to obtain the value to be measured with respect to the object, the improvement comprising the steps of:

C. converting said addition and subtraction pulse signals in each of said first and second series into rectangular pulses, each of said rectangular pulses being selected to have an approximately predetermined duration greater than said minimal sequential response interval of said counting means, D. producing a first logic NOR combination output and a first logic AND combination output of said rectangular pulses derived from said addition pulse signals of said first and second series, E. producing a second logic NOR combination output and a second logic AND combination output of said rectangular pulses derived from said subtraction pulse signals of said first and second series, F. producing a third logic AND combination output of said rectangular pulses derived from said addition pulse signals of said first series and from said subtraction pulse signals of said second series, G. producing a fourth logic AND combination output of said rectangular pulses derived from said subtraction pulse signals of said first series and from said addition pulse signals of said second series, H. differentiating said first NOR and first AND combination outputs to respectively produce a first and a second series of instantaneous output pulses, wherein the time interval between said instantaneous output pulses occurring in said first and second series of instantaneous output pulses is caused to be at least said predetermined duration, I. differentiating said second NOR and said AND combination outputs to produce respectively a third and a fourth series of instantaneous output pulses, wherein the time interval between said instantaneous output pulses occurring in said third and fourth series of instantaneous output pulses is caused to be at least said predetermined duration, J. producing a first logic OR combination of said first and said second series of instantaneous output pulses, K. producing a second logic OR combination output of said third and said fourth series of instantaneous output pulses, L. producing a third logic OR combination output of said third and said fourth AND combination outputs, M. differentiating said third logic OR combination output to produce a fifth series of instantaneous output pulses, N. converting said fifth series of instantaneous output pulses into rectangular pulses, the duration of each pulse in said fifth series being selected to be at least longer than said predetermined duration, O. producing negative pulses by inverting the rectangular pulses derived from said fifth series of instantaneous output pulses, P. producing a fifth logic AND combination output of said first logic OR combination output and said negative pulses, and Q. producing a sixth logic AND combination output of said second logic OR combination output and said negative pulses, thereby permitting said fifth logic AND combination output and said sixth logic AND combination output derived respectively from said addition pulse signals and said subtraction pulse signals to be counted by one and the same reversible counting means without the type of faulty counter operation in which two pulses occur sequentially so fast that the counter cannot respond separately to the second of the two pulses.

6. In a process for digital measurement of a value with respect to an object comprising the steps of:

A. generating a first and a second series each of addition and subtraction pulse signals indicative of said value respectively by means of a first and a second detecting station, each station being moved from the respective reference point thereof until it reaches a predetermined point with respect to the object, said addition pulse signals being generated when each of said first and second detecting stations is moved in a predetermined direction with respect to each of said detecting stations while said subtraction pulse signals are generated when each of said detecting stations is moved in the opposite direction, and B. counting said addition and subtraction pulse signals of said first and second series by reversible counting means having a minimal sequential response interval so as to obtain the value to be measured with respect to the object the improvement comprising the steps of:

C. converting said addition and subtraction pulse signals in each of said first and second series into rectangular pulses, each of said rectangular pulses being selected to have about a predetermined duration greater than said minimal sequential response interval of said counting means, D. producing a first logic OR combination output and a first logic NAND combination output of said rectangular pulses derived from said addition pulses signals of said first and second series, E. producing a second logic OR combination output and a second logic NAND combination output of said rectangular pulses derived from said subtraction pulse signals of said first and second series, F. producing a first logic AND combination output of said rectangular pulses derived from said addition pulse signals of said first series and from said subtraction pulse signals of said second series, G. producing a second logic AND combination output of said rectangular pulses derived from said subtraction pulse signals of said first series and from said addition pulse signals of said second series, H. differentiating said first OR and said first NAND combination outputs to produce respectively a first and a second series of instantaneous output pulses, wherein the time interval of said instantaneous output pulses occurring in said first and second series is at least equal to said predetermined duration, I. differentiating said second OR and said second NAND combination outputs to produce respectively a third and a fourth series of instantaneous output pulses wherein the time interval of said instantaneous output pulses occurring in said third and fourth series is at least equal to said predetermined duration, J. producing a third logic OR combination output of said first and said second series of instantaneous output pulses, K. producing a fourth logic OR combination output of said third and said fourth series of instantaneous output pulses, L. producing a fifth logic OR combination output of said first and second AND combination outputs, M. differentiating said fifth logic OR combination output to produce a fifth series of instantaneous output pulses, N. converting said fifth series of instantaneous output pulses into rectangular pulses, the duration of each rectangular pulse being selected to be at least longer than said predetermined duration, O. producing negative pulses by inverting said rectangular pulses derived from said fifth series of instantaneous output pulses, P. producing a third logic AND combination output of said third logic OR combination output and said negative pulses, and Q. producing a fourth logic AND combination output of said second logic OR combination output and said negative pulses, thereby permitting said third logic AND combination output and said fourth logic AND combination output, derived respectively from said addition pulse signals and said subtraction pulse signals, to be counted by one and the same counting means without the type of faulty counter operation in which two pulses occur sequentially so fast that the counter cannot respond separately to the second of the two pulses.

7. A digital measurement apparatus comprising:
A. first measurement means for generating a first train of pulses,
B. Second measurement means for generating a second train of pulses,
C. counter means having a minimal sequential response interval,
D. means responsive to said first train of pulses for generating a corresponding first series of rectangular pulses,
E. means responsive to said second train of pulses for generating a corresponding second series of rectangular pulses, each of the rectangular pulses in said first and second series being at least equal in length to said minimal sequential response interval,
F. first and second logic means each having said first and said second series as inputs, one of said logic means being a gate having one type of OR function and the other of said logic means being a gate having one type of AND function, said first and said second logic means respectively producing a first and a second logic combination output signal,
G. OR gate means responsive to said first and said second logic combination output signals for generating a combined pulse train for application to said counter means as a signal to be counted.

8. An apparatus according to claim 7 wherein said one type of OR function is a noninverted OR and said one type of AND function is a NAND function.

9. An apparatus according to claim 7 wherein said one type of OR function is a NOR function and said one type of AND function is a noninverted AND.

10. An apparatus according to claim 7 wherein said OR gate means further comprises:
A. an OR gate having two input terminals,
B. means for differentiating said first logic combination output signal to derive a first differentiated signal for application to one of said two input terminals, and
C. means for differentiating said second logic combination output signal to derive a second differentiated signal for application to the other of said two input terminals.

11. An apparatus according to claim 7 wherein said first measurement means and said second measurement means respectively comprise first and second detectors, each of said detectors comprising an elongated feeler, said detectors being mounted with their respective feelers facing each other, aligned on a common axis, and further comprising:
means for moving the feelers with respect to each other to measure the distance therebetween.

12. A process for processing digital data in order to merge two input trains of pulses into a single output train of pulses while preventing any two adjacent pulses in said single output train which are respectively derived from said two input trains from occurring any closer in time to each other than a predetermined minimal sequential response interval, comprising the steps of:
A. generating a first one of said two input trains in response to a first measurement operation,
B. generating a second one of said two input trains in response to a second measurement operation,
C. generating a first series of rectangular pulses corresponding to said first one of said two input trains,
D. generating a second series of rectangular pulses corresponding to said second one of said two input trains, the rectangular pulses in said first and said second series of rectangular pulses being at least equal in length to said minimal sequential response interval,
E. logically combining said first and said second series by one type of OR function to provide a first logic combination output signal,
F. logically combining said first and said second series by one type of AND function to provide a second logic combination output signal, and
G. logically combining said first and said second logic combination output signal by an OR function to produce said single output train of pulses.

* * * * *